May 30, 1939.    L. R. HEIM    2,160,382
METHOD OF MAKING ROLLER BEARINGS
Filed Aug. 1, 1936
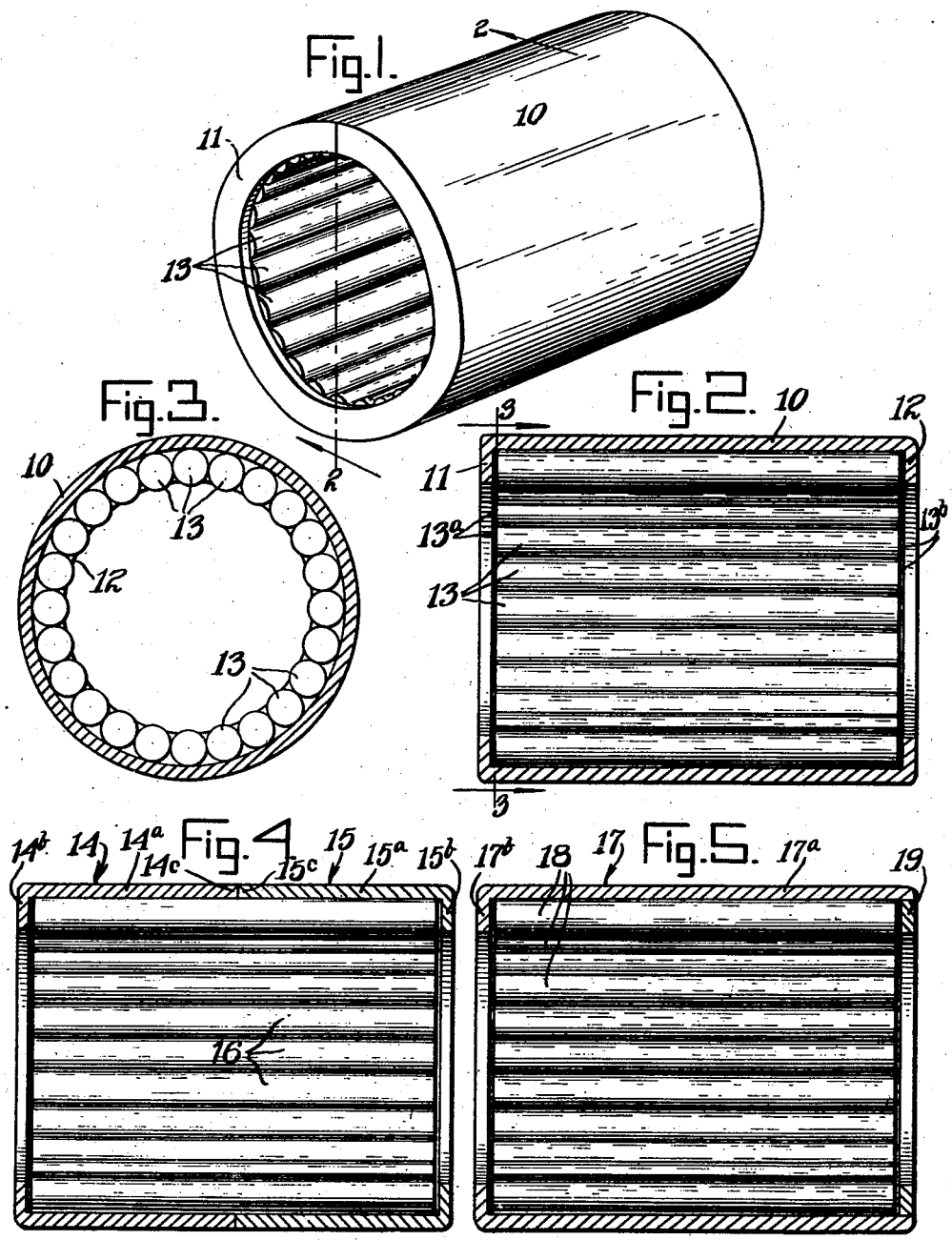
INVENTOR
Lewis R. Heim
BY
Blair, Curtis + Dunne
ATTORNEYS Patented May 30, 1939

2,160,382

UNITED STATES PATENT OFFICE 2,160,382

METHOD OF MAKING ROLLER BEARINGS

Lewis R. Heim, Mount Dora, Fla.

Application August 1, 1936, Serial No. 93,774

10 Claims. (Cl. 29—148.4)

This invention relates to roller bearings and method of making the same.

One of the objects of this invention is to provide a roller bearing which is simple and sturdy in construction, inexpensive in manufacture, and thoroughly reliable and durable under conditions of rigorous and extended use. Another object of this invention is to provide a roller bearing which requires a minimum amount of room for mounting and which, while sturdy and durable, is relatively light in weight. Another object of the invention is to provide a roller bearing well adapted to effect an anti-friction mount for small high speed shafts or the like, and which is easily lubricated under practically any operating conditions. Another object is to provide a roller bearing which may be fabricated from inexpensive materials. Another object of this invention is to provide a method of making a roller bearing which is simple, inexpensive, thoroughly practical and readily carried out under high production requisites. Other objects will be in part apparent and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawing, in which is shown several of the various possible embodiments of my invention, Figure 1 is a perspective view of my roller bearing;

Figure 2 is a sectional elevation of the bearing taken along line 2—2 of Figure 1;

Figure 3 is a sectional elevation taken along line 3—3 of Figure 2;

Figure 4 is a sectional elevation similar to Figure 2, but showing a modification of my bearing; and, Figure 5 is a sectional elevation similar to Figure 2, showing another modification of my bearing.

Similar reference characters refer to similar parts throughout the several views of the drawing.

In order that a better understanding may be had of the various features of this invention, it might be well to point out here that numerous difficulties are encountered in the manufacture of small, light-weight bearings, particularly roller bearings. Many of these bearings are unduly complicated through the necessity of providing various devices by which the rolls are held in their operating position. These roll retaining devices add materially to the cost of the bearing and complicate assembly thereof. Still other bearings necessitate extensive machining operations, which are not only time consuming, and accordingly expensive, but are also quite difficult to effect with any degree of efficiency in a small bearing. It is also noted that many of these small bearings readily become disassembled while being shipped, or upon installation, both of which materially inconvenience their commercial use. Still others present lubrication problems which are difficult to solve by conventional methods. It is, of course, obvious that any anti-friction device must be perfectly round and this roundness is difficult to obtain in the above-noted small machined bearings. Accordingly, it is another object of this invention to rectify the above-noted conditions, as well as many others, in a thoroughly efficient and practical manner.

Referring to Figure 1 of the drawing, my bearing comprises a one piece or unitary roll race 10, provided at opposite ends with flanges 11 and 12. Race 10 is accordingly substantially U-shaped in cross section, providing a circular channel in which is disposed a plurality of rolls 13 (Figure 3).

Rolls 13 (Figure 2) preferably have flat ends 13a and 13b which are respectively adjacent flanges 11 and 12, being spaced therefrom a sufficient distance to provide an operative clearance and also to provide space for oil or other lubricant. It may readily be seen that after rolls 13 are installed within the race, flanges 11 and 12 positively preclude axial displacement thereof.

To prevent radial displacement of rolls 13 from race 10, I preferably dimension both the race and rolls in such manner that when a full complement of rolls are installed within the race in a manner to be pointed out hereinafter, the rolls overlap or interlock to a certain extent, that is, each roll acts as a keystone to the remainder, effectively preventing radial displacement of the rolls. Thus, I do not have to provide any roll retaining device either as a separate part or as additional fabrication of the roll race or the flanges thereof. Furthermore, this full complement of rolls provides a maximum load capacity for the bearing, and due to the non-displaceability of the rolls, greatly facilitates shipment and installation of the bearing. It should also be noted that the unitary construction of race 10 results in a single thickness of metal, which not only reduces the weight of the bearing, but also requires a minimum amount of room for the mounting of the bearing. Furthermore, this unitary construction precludes disassembly of any part of the bearing.

As pointed out above, flanges 11 and 12, in Figure 2, effectively prevent axial displacement of the rolls. However, as these flanges are square with the axis of the rolls, they function quite efficiently in resisting a certain amount of end thrust and in effecting end location of the rolls. Furthermore, the flanges being square, there is no necessity for machining the ends of the rolls to effect conformity between the roll ends and adjacent flanges, all of which materially reduces the cost of production of the bearing, while increasing its carrying or load capacity per given length of bearing.

Preferably race 10 and its flanges 11 and 12 are formed of flat sheet metal. Preferably the sheet metal is drawn or formed between male and female dies which press the flat stock into a tube flanged at one end. Subsequent to this operation, the flange on the other end of the tube may be formed by spinning or another stamping operation. It should be noted that from stamping, or drawing the sheet metal into the tubular form, as pointed out above, the inner and outer surfaces of race 10 become quite smooth, these surfaces in effect having a polished finish, which precludes in most instances the necessity of grinding operation to provide a perfect tracking surface for rolls 13. It should also be noted that the formation of a roll race by the above-noted method assures a perfectly round bearing race, the tracking surface of which is continuous axially and peripherally, and accordingly presents no cracks or corners which might detract from long bearing life. Furthermore, the above-noted method results in uniform bearing size for a large number of units, and is particularly well-adapted to high production requisites.

Subsequent to forming the flanged roll race, rolls 13 are installed therein. I prefer to effect the installation of the rolls by expanding the race or shrinking the rolls, or both. Thus the race may be heated to a suitable temperature to effect a partial expansion thereof, which permits the ready insertion of a full complement of rolls. Upon cooling of the race, it contracts and the rolls are effectively held in their operative position by their keystone relationship. Under certain circumstances, however, it is desirable to subject the rolls to liquid air, dry ice or some other low temperature medium which contracts the rolls. A full complement of the cold rolls is then inserted in the hot race, the high temperature of the race tending to heat the cold rolls to expand them, and the low temperature of the rolls tending to reduce the high temperature of the race to effect its contraction. Thus, one expands and the other contracts to result in the related assembly of the two and the attainment of the overlapping or keystone relationship of the rolls within the race. Under still other circumstances, assembly may be effected by inserting the chilled rolls without heating the race.

It should further be noted, in connection with the "expansion-shrinking" method of assembly, that it is possible under certain circumstances to accomplish at the same time a heat treating or hardening of the race, thus efficiently saving the time and expense which would otherwise be necessary in tempering the race by a separate operation.

It will thus be seen that I have provided a unitary roller bearing having a maximum roll capacity and accordingly a maximum load capacity, the bearing furthermore being unitary and highly resistant to casual disassembling forces. Thus, storage, shipment and installation are greatly facilitated.

In the embodiment shown in Figure 4, the bearing comprises a pair of shells generally indicated at 14 and 15. As these shells are substantially identical, shell 14 only will be described. Shell 14, accordingly, comprises a tubular portion 14a, having formed on one end thereof a flange 14b. Shell 14 may be fabricated in any suitable manner as, for example, in the manner pointed out in my copending application, Serial No. 735,802, filed July 18, 1934. Shell 15 comprises similarly a tubular portion 15a having a flange 15b formed on one of its ends.

Thus shells 14 and 15 are complementary to one another in forming a roll race substantially U-shaped in cross section and when in assembly have their adjacent ends 14c and 15c in abutting relationship. In assembling this bearing, I prefer to load either shell 14 or 15 with a full complement of rolls 16, the rolls and shell being so dimensioned that when the rolls are in place, the keystone relationship described hereinabove is effected. Thereafter the other shell is placed over the projecting ends of rolls 16 until edges 14c and 15c of the shells abut. It should also be noted that in this bearing the ends of rolls 16 are flat and are preferably slightly spaced from adjacent flanges 14b and 15b, for the same purpose as pointed out above with respect to the bearing shown in Figures 1 and 2.

In the bearing shown in Figure 5, I provide a shell generally indicated at 17, which comprises a tubular portion 17a having formed in one end thereof a flange 17b. Shell 17 may be formed in any suitable manner, but preferably I employ the method described in my above-noted copending application. After the formation of shell 17, a full complement of rolls 18 is inserted in the open end of the shell until the rolls abut flange 17b. Here again I prefer to dimension rolls 18 and shell 17 so that upon installation of all of the rolls they are maintained against radial displacement by the keystone relationship described hereinabove. After the rolls have been positioned in shell 17, I position a washer or annular ring 19 in the open end of shell 17. Washer 19 may be held within the shell in any suitable manner, but preferably is so dimensioned that it is maintained in its assembled or operative position by means of a force fit between its outer periphery and the inner periphery of shell 17. It may now be seen that washer 19 supplements flange 17b of the shell, preventing axial displacement of rolls 18.

Under certain circumstances it is possible to dispense with washer 19. For example, where the right hand end of shell 17 as viewed in Figure 5 is positioned in a journal bored in a casting or the like and closed at one end, the closed end of the journal effectively prevents axial displacement of rolls 18 and the provision of washer 19 is unnecessary. Similarly where the bearing is mounted on a shaft provided with a shoulder, such shoulder may well be utilized to prevent axial displacement of rolls 18; thus avoiding the necessity of washer 19.

It may now be seen that in both of the bearings shown in Figures 4 and 5, simplicity and low cost of manufacture is achieved. Furthermore, both of these bearings are quite light in construction, though sufficiently strong and rigid to effectively withstand substantial loads.

It may further be seen that I have provided a roller bearing, and method of making the same, which effectively accomplishes the several objects referred to hereinabove in a thoroughly efficient and practical manner.

As many possible embodiments may be made of the mechanical features of the above invention and as the art herein described might be varied in various parts, all without departing from the scope of the invention, it is to be understood that all matter hereinabove set forth, or shown in the accompanying drawing is to be interpreted as illustrative and not in a limiting sense.

I claim:

1. The method of making a self-sustaining unitary roller bearing having an outer roll race only which includes the steps of forming a one-piece cylindrical roll race, forming a plurality of rolls, expanding said race radially, inserting said rolls radially in said race in unseparated relationship, and contracting said race to effect an interlocking relationship between said rolls.

2. The method of making a self-sustaining unitary roller bearing having an outer roll race only which includes the steps of forming a roll race whose tracking surface is continuous and unbroken circumferentially and axially, forming an integral flange on each end of said race, forming a plurality of rolls for installation in said race which when installed will maintain themselves in their operative position, each roll acting as a keystone to the others, and effecting a temperature differential between said race and said rolls to permit the radial installation of said rolls in said race between said flanges, said rolls assuming their keystone relationship upon the destruction of said temperature differential.

3. The method of making a self-sustaining unitary roller bearing having an outer roll race only which includes the steps of forming a roll race whose tracking surface is continuous and unbroken circumferentially and axially, forming an integral flange on each end of said race, forming a plurality of rolls for installation in said race which when installed will maintain themselves in their operative position, each roll acting as a keystone to the others, heating the entire race to effect a radial expansion thereof, and installing said rolls in said race between said flanges whereby upon cooling of said race the rolls become locked therein.

4. The herein described art which includes the steps of forming a roll race having a tracking surface unbroken axially and circumferentially, inturning the ends of said race toward the axis thereof to form integral flanges thereon, expanding said race radially, radially installing a complement of rolls in said race between said flanges, and contracting said race to bring said rolls into mutual keystone relationship whereby the rolls of themselves resist radial displacement.

5. The method of making a self-sustaining unitary roller bearing having an outer roll race only, which includes the steps of stamping from sheet metal a single thickness roll race having uninterrupted and smooth inner and outer peripheries, bending the ends of said race to form integrally radially extending flanges thereon, said race and flanges forming an annular channel, and inserting a complement of rolls in said channel, said rolls being so formed that when installed each acts as a keystone to the others to prevent radial displacement thereof.

6. The method of making a self-sustaining unitary anti-friction bearing which includes the steps of forming a cylindrical roll race, forming a flange on each end of said race, chilling a complement of rolling members by immersing them in a cooling medium, and installing said chilled members in said race between said flanges so that when the temperature of said rolling members rises they will expand within said race.

7. The method of making a self-sustaining unitary anti-friction bearing which includes the steps of forming a cylindrical roll race, forming a flange on each end of said race, forming a plurality of rolls for installation in said race which when installed will maintain themselves in their operative position, each roll acting as a keystone to the others, and effecting a temperature differential between said race and said rolls to permit the installation of said rolls in said race between said flanges, said rolls assuming their keystone relationship upon the destruction of said temperature differential.

8. The method of making a self-sustaining unitary anti-friction bearing which includes the steps of forming a cylindrical roll race, forming a flange on each end of said race, forming a plurality of rolls for installation in said race which when installed will maintain themselves in their operative position, each roll acting as a keystone to the others, and contracting said rolls by chilling them in a cooling medium to permit installation of the rolls in said race between said flanges, said rolls assuming their keystone relationship when expansion thereof occurs through elevation of the temperature.

9. A method of making a self-sustaining unitary anti-friction bearing having an outer roll race only which includes the steps of forming a cylindrical roll race, forming a flange on each end of said race, forming a plurality of rolls for installation in said race, effecting a temperature differential between said race and said rolls to effect relative expansion of the race and contraction of the rolls, and installing said rolls in said race between the flanges thereof, whereby upon destruction of said temperature differential a relative expansion of the rolls and contraction of the race results.

10. The method of making a self-sustaining unitary anti-friction bearing which includes the steps of forming a cylindrical roll race, forming a flange on each end of said race, chilling a complement of rolls by immersing them in a cooling medium, heating said race by immersing it in a heating medium, and installing said chilled rolls in said heated race between the flanges thereof so that when the temperature of the rolls rises and the temperature of the race falls, the rolls will expand within the race and the race will contract about the rolls.

LEWIS R. HEIM.